US008228983B2

(12) United States Patent
Cham et al.

(10) Patent No.: US 8,228,983 B2
(45) Date of Patent: Jul. 24, 2012

(54) METHOD AND DEVICE FOR ORDER-16 INTEGER TRANSFORM FROM ORDER-8 INTEGER COSINE TRANSFORM

(75) Inventors: Wai-Kuen Cham, Hong Kong (HK); Chi Keung Fong, Hong Kong (HK); Jie Dong, Hong Kong (HK); King Ngi Ngan, Hong Kong (HK); Hoi Ming Wong, Hong Kong (HK); Lu Wang, Hong Kong (HK); Yan Huo, Hong Kong (HK); Thomas H. Y. Pun, Hong Kong (HK)

(73) Assignees: Hong Kong Applied Science and Technology Research, Hong Kong Science Park; Institute Company Limited, Shatin, New Territories, Hong Kong (CN)

( * ) Notice: Subject to any disclaimer, the term of this patent is extended or adjusted under 35 U.S.C. 154(b) by 1260 days.

(21) Appl. No.: 11/950,182

(22) Filed: Dec. 4, 2007

(65) Prior Publication Data

US 2009/0141796 A1 Jun. 4, 2009

(51) Int. Cl.
*H04B 1/66* (2006.01)
*H04N 7/12* (2006.01)
*H04N 11/02* (2006.01)
*H04N 11/04* (2006.01)

(52) U.S. Cl. ......... 375/240.03; 375/240.01; 375/240.29; 382/232; 382/253

(58) Field of Classification Search ........................ None
See application file for complete search history.

(56) References Cited

U.S. PATENT DOCUMENTS

| 6,856,262 | B2* | 2/2005 | Mayer et al. ............... 341/50 |
|---|---|---|---|
| 2003/0156648 | A1 | 8/2003 | Holcomb et al. |
| 2004/0062309 | A1 | 4/2004 | Romanowski et al. |
| 2004/0151253 | A1* | 8/2004 | Bossen ............... 375/243 |
| 2005/0256916 | A1* | 11/2005 | Srinivasan et al. ....... 708/400 |
| 2006/0251330 | A1* | 11/2006 | Toth et al. ............... 382/236 |
| 2007/0081734 | A1* | 4/2007 | Sullivan et al. .......... 382/250 |
| 2007/0223590 | A1* | 9/2007 | Ma .................... 375/240.18 |
| 2007/0237235 | A1* | 10/2007 | Krishnan ............ 375/240.18 |
| 2008/0031545 | A1* | 2/2008 | Nowicki et al. ........... 382/298 |

OTHER PUBLICATIONS

Dong, Jie; Ngan, King Ngi; Fong, Chi Keung; Cham, Wai Kuen; A Universal Approach to Developing Fast Algorithm for Simplified Order-16 ICT, IEEE International Symposium on Circuits and Systems, 2007, May 27-30, 2007, pp. 281-284, IEEE, US.

Cham, W.K.; Chan, Y.T., An order-16 integer cosine transform, IEEE Transactions on Signal Processing, May 1991 pp. 1205-1208, vol. 39, Issue 5, IEEE, US.

Ma, Siwei; Jao, Kuo, C.-C. J., High-definition video coding with super-macroblocks, Proceedings—SPIE The International Society for Optical Engineering, p. 41, vol. 6508, part 1, International Society for Optical Engineering, US, Jan. 2007.

* cited by examiner

*Primary Examiner* — Gary Mui
*Assistant Examiner* — Lonnie Sweet
(74) *Attorney, Agent, or Firm* — Ella Cheong Hong Kong; Margaret A. Burke; Sam T. Yip

(57) ABSTRACT

The invention is used in video coding. Systems, apparatuses and methods for processing an order-16 integer transform from an order-8 transform are provided. The order-16 transform method involves expanding an order-8 transform by generating an order-16 integer matrix and a scaling matrix.

14 Claims, 6 Drawing Sheets

US 8,228,983 B2

METHOD AND DEVICE FOR ORDER-16 INTEGER TRANSFORM FROM ORDER-8 INTEGER COSINE TRANSFORM

TECHNICAL FIELD

The presently claimed invention has applicability with media implementations where video signal compression is desirable. An Adaptive Block-size Transform method is hereby disclosed that improves the compression efficiency of a video coding system and as such has applicability to the video broadcast and computer industries. The presently claimed invention relates to integer transforms of encoding and decoding for image and video signals. More specifically, the claimed invention relates to processing an order-16 transform from an order-8 transform in the field of image and video coding.

BACKGROUND OF THE INVENTION

Lossless compression algorithms do not deliver compression ratios that are high enough for most broadcast and internet transmission applications. As a result, most multimedia compression algorithms are lossy. Lossy compression yields a much higher compression ratio than that of lossless compression owing to the fact that the compressed data is not the same as the original data, but a close approximation of it. With a relatively conservative compression ratio, the compressed data and the original can appear to be the perceptually indistinguishable. Known implementations of lossy compression algorithms include JPEG, JPEG2000, DPCM, MPEG1, MPEG2, MPEG4 and others.

Integer transforms have been widely used in the latest video coding standards, such as H.264, VC-1, and Audio Video Standard (AVS) as the corresponding data sizes involved do not permit a lossless compression method.

Known implementations of video coding methods have been documented including "High-definition Video Coding with Super-macroblocks," Siwei Ma and C.-C. Jay Kuo; Proc. of SPIE-IS&T Electronic Imaging, SPIE Vol. 6508, 650816, Visual Communications and Image Processing 2007. While a complex transform is mentioned, the disclosed transform has a low the energy-packing ability and as such suffers from performance limitations.

Another implementation is described in "A Universal Approach to Developing Fast Algorithm for Simplified Order-16 ICT," Jie Dong; King Ngi Ngan; Chi Keung Fong; Wai Kuen Cham; IEEE International Symposium on Circuits and Systems, 2007. ISCAS 2007. 27-30 May 2007 Page(s): 281-284. A similar implementation is also disclosed in "An order-16 integer cosine transform," Cham, W. K.; Chan, Y. T.; IEEE Transactions on Signal Processing, Volume 39, Issue 5, May 1991 Page(s): 1205-1208. Transforms mentioned in above two papers are complex and as such suffer from restrictions on when they would be suitably implemented and as such do not offer the best balance between their complexity and respective energy-packing ability.

Integer transforms of video coding in the prior art have mainly focused on the creation of integer transform matrices. U.S. Patent Publication No. 20030156648 entitled "Sub-block transform coding of prediction residuals" employs a closed loop evaluation of the different transform sizes and switching levels but describes a predictive system rather than a system optimized for a particular order transform.

In addition, U.S. Patent Publication No. 20070223590 discloses a method which reduces computational complexity of integer transforms. The method uses a 2N×2N integer transform matrix. Similarly, United States Patent Application 20040062309 entitled "Method for transformation-coding full motion image sequences" in which motion vectors are estimated block-by-block, with which said motion vectors motion compensation is carried out, but the disclosed method is distinguishable from the claimed invention as it is does not undertake the claimed transform.

SUMMARY OF THE INVENTION

In the following description, numerous details on matrix operation are set forth. The following matrix notations are used which are not exhaustive and any update or modifications to the same could be undertaken by those skilled in the art. In particular, $E_8$ represents a transform matrix for order-8 integer transforms, and $K_8$ represents a scaling matrix for the corresponding order-8 integer transform. $E_{16}$ represents a transform matrix for order-16 integer transforms; whereas $K_{16}$ represents a scaling matrix for the corresponding order-16 integer transform.

For the first embodiment of the claimed invention, $E_A$ is used to represent a transform matrix for order-16 integer transforms; whereas $K_A$ represents a corresponding scaling matrix.

For the second embodiment of the claimed invention, $E_B$ is used to represent a transform matrix for order-16 integer transforms; whereas $K_B$ represents a corresponding scaling matrix.

Order-8 integer transforms have been widely used in the latest video coding standards because of their comparable energy packing ability and simple implementation in comparison to the DCT. The disclosed two order-16 transforms also have high energy packing ability and provides high fidelity for data compression. When considering the conversion of $X=[x_0, x_1, \ldots, x_{15}]^t$ into $Z=[z_0, z_1, \ldots, z_{15}]^t$ as described in $Z=E_{16} X$, a transform is good if it can pack more energy into low frequency coefficients, that is $z_u$ with small u and as a result leave little energy to high frequency coefficients, i.e. $c_u$ with u close to 15. The coefficient $z_u$ is the correlation between the u basis vector and the signal vector. Coefficient $z_u$ will have a large magnitude if the basis vector and the signal vector have similar shape. Consequently, a good transform will have its low frequency basis vectors (e.g. the first few rows of $E_A$ and $E_B$ below) resembling a slowly changing signal vector while a less promising transform does not. The disclosed basis vectors tend to produce large magnitude low frequency coefficients (e.g. $z_1$, $z_2$ and $z_3$) and small magnitude high frequency coefficients. The first few basis vectors of the 2 disclosed transforms are the same and they are:

$E_1$=[12 12 10 10 6 6 3 3 −3 −3 −6 −6 −10 −10 −12 −12]
$E_2$=[8 8 4 4 −4 −4 −8 −8 −8 −8 −4 −4 4 4 8 8]
$E_3$=[10 10 −3 −3 −12 −12 −6 −6 6 6 12 12 3 3 −10 −10]

An Adaptive Block-size Transform method is hereby disclosed that improves the compression efficiency of a video coding system. The claimed Adaptive Block-size Transform method improves video compression efficiency by utilizing a low-complexity order-16 transform by expanding an order-8 transform. As a result of the claimed method, high energy-packing ability for data compression is attained and a Fast Computation Algorithm is disclosed. By using the claimed method which chooses the suitable transform block size automatically, quantization and rescaling process is similar to that for an order-8 transform. The claimed invention generates an order-16 transform by expanding an order-8 transform. A low-complexity order-16 transform that has high energy-packing ability is useful for data compression such as providing high fidelity for the data compression. The claimed invention requires only addition and subtraction operations in the primary embodiment. As a result, if the order-8 transform is an integer transform, then the resultant order-16 integer transform is also an integer transform. The claimed invention can be used with scaling which is an implementation method for a transform. There are at least three types of scaling methods which are conventional scaling, prescaling and postscaling adopted in H.264, AVS and MS media player respectively. Hence, the disclosed transforms can be implemented with any of these scaling methods. In the claimed invention, a transform T is said to be an integer transform if T can expressed as DE where E is a matrix containing only integers and D is a diagonal matrix. The (i,i)th element of D is to normalize the ith row of E so that each row of E has magnitude equal 1. In many coding applications, a transform needs to be implemented with good precision. An integer transform can be implemented with good precision easily if the integers are small.

Moreover, the order-16 transform can be computed using a fast algorithm based on a fast algorithm for the order-8 transform. The resulting transform coefficients in one embodiment are quantized using a quantization process similar to that for order-8 transform. In this embodiment of the claimed invention, the transform process, fast algorithm and the quantization process using the order-8 ICT (Integer Cosine Transform) in AVS are illustrated as an example. The claimed invention is applicable to any order-8 transform and can be used together with any quantization process.

The claimed invention generates two different order-16 transforms from an order 8 transform. In this embodiment, X is an 8×8 matrix containing pixels and Y is the 8×8 matrix containing the ICT coefficients of X. The (i,j)th element of X and Y are $x_{i,j}$ and $y_{i,j}$ respectively. In AVS, the forward 2D ICT of X into Y are computed in this embodiment as follows:

$$Y = (E_8 X E_8^T) \otimes K_8 \otimes K_8 = \left(E_8 \begin{bmatrix} x_{0,0} & x_{0,1} & \cdots & x_{0,7} \\ x_{1,0} & x_{1,1} & & x_{1,7} \\ \vdots & & \ddots & \vdots \\ x_{7,0} & x_{7,1} & \cdots & x_{7,7} \end{bmatrix} E_8^T\right) \otimes K_8 \otimes K_8$$

$E_8$ is the integer matrix and $$E_8 = \begin{bmatrix} 8 & 8 & 8 & 8 & 8 & 8 & 8 & 8 \\ 10 & 9 & 6 & 2 & -2 & -6 & -9 & -10 \\ 10 & 4 & -4 & -10 & -10 & -4 & 4 & 10 \\ 9 & -2 & -10 & -6 & 6 & 10 & 2 & -9 \\ 8 & -8 & -8 & 8 & 8 & -8 & -8 & 8 \\ 6 & -10 & 2 & 9 & -9 & -2 & 10 & -6 \\ 4 & -10 & 10 & -4 & -4 & 10 & -10 & 4 \\ 2 & -6 & 9 & -10 & 10 & 9 & 6 & -2 \end{bmatrix}$$

$K_8$ is the scaling matrix derived from the diagonal matrix D and $$K_8 = \begin{bmatrix} a^2 & ab & ac & ab & a^2 & ab & ac & ab \\ ab & b^2 & bc & b^2 & ab & b^2 & bc & b^2 \\ ac & bc & c^2 & bc & ac & bc & c^2 & bc \\ ab & b^2 & bc & b^2 & ab & b^2 & bc & b^2 \\ a^2 & ab & ac & ab & a^2 & ab & ac & ab \\ ab & b^2 & bc & b^2 & ab & b^2 & bc & b^2 \\ ac & bc & c^2 & bc & ac & bc & c^2 & bc \\ ab & b^2 & bc & b^2 & ab & b^2 & bc & b^2 \end{bmatrix}$$

where $\begin{cases} a = \dfrac{1}{\sqrt{512}} \\ b = \dfrac{1}{\sqrt{442}} \\ c = \dfrac{1}{\sqrt{464}} \end{cases}$ $\otimes$ represents the matrix-element-to-matrix-element multiplication. The inverse 2D ICT of Y into X is:

$$X = E_8^T Y E_8 = E_8^T \begin{bmatrix} y_{0,0} & y_{0,1} & \cdots & y_{0,7} \\ y_{1,0} & y_{1,1} & & y_{1,7} \\ \vdots & & \ddots & \vdots \\ y_{7,0} & y_{7,1} & \cdots & y_{7,7} \end{bmatrix} E_8$$

According to the claimed invention an order-8 ICT $T_8$ is expanded into an order-16 integer transform $T_{16}$ by generating an order-16 integer matrix $E_A$ as follows:

$$E_A = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 2 & -2 & -6 & 6 & 9 & -9 & -10 & 10 & 10 & -10 & -9 & 9 & 6 & -6 & -2 & 2 \\ 4 & -4 & -10 & 10 & 10 & -10 & -4 & 4 & -4 & 4 & 10 & -10 & -10 & 10 & 4 & -4 \\ 6 & -6 & -10 & 10 & 2 & -2 & 9 & -9 & -9 & 9 & -2 & 2 & 10 & -10 & -6 & 6 \\ 8 & -8 & -8 & 8 & -8 & 8 & 8 & -8 & 8 & -8 & -8 & 8 & -8 & 8 & 8 & -8 \\ 9 & -9 & -2 & 2 & -10 & 10 & -6 & 6 & 6 & -6 & 10 & -10 & 2 & -2 & -9 & 9 \\ 10 & -10 & 4 & -4 & -4 & 4 & -10 & 10 & -10 & 10 & -4 & 4 & 4 & -4 & 10 & -10 \\ 10 & -10 & 9 & -9 & 6 & -6 & 2 & -2 & -2 & 2 & -6 & 6 & -9 & 9 & -10 & 10 \\ 8 & -8 & 8 & -8 & 8 & -8 & 8 & -8 & 8 & -8 & 8 & -8 & 8 & -8 & 8 & -8 \end{bmatrix}$$

According to the claimed invention scaling matrix $K_A$ $$K_A = \frac{1}{2}\begin{bmatrix} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{bmatrix}$$

The forward 2D ICT of 16×16 matrix X into 16×16 matrix Y in one embodiment is computed by:

$$Y = (E_A X E_A^T) \otimes K_A \otimes K_A = \left(E_A \begin{bmatrix} x_{0,0} & x_{0,1} & \cdots & x_{0,15} \\ x_{1,0} & x_{1,1} & & x_{1,15} \\ \vdots & & \ddots & \vdots \\ x_{15,0} & x_{15,1} & \cdots & x_{15,15} \end{bmatrix} E_A^T\right) \otimes K_A \otimes K_A$$

The inverse 2D ICT of Y into X is $$X = E_A^T Y E_A = E_A^T \begin{bmatrix} y_{0,0} & y_{0,1} & \cdots & y_{0,15} \\ y_{1,0} & y_{1,1} & & y_{1,15} \\ \vdots & & \ddots & \vdots \\ y_{15,0} & y_{15,1} & \cdots & y_{15,15} \end{bmatrix} E_A$$

To implement the first embodiment of the order-16 transform $Z = (E_A X E_A^T)$, an intermediate data set Z' can be obtained in a first stage by the matrix operation $Z' = (E_A X)$. The intermediate data set Z' is further processed by the operation $Z = (Z' E_A^T)$ to obtain the output data set Z.

Alternatively, fast algorithm can be applied to implement the order-16 transform. The fast algorithm includes 2 order-8 fast ICTs and 8 additions and 8 subtractions as shown in FIG. 1.

Similar to the first embodiment, the second embodiment generates an order-16 transform from an order-8 transform. In the second embodiment, X is an 8×8 matrix containing pixels and Y is the 8×8 matrix containing the ICT coefficients of X. The (i, j)th element of X and Y are $x_{i,j}$ and $y_{i,j}$ respectively. In AVS, the forward 2D ICT of X into Y is computed as follows using the following:

$$Y = (E_B X E_B^T) \otimes K_B \otimes K_B = \left(E_B \begin{bmatrix} x_{0,0} & x_{0,1} & \cdots & x_{0,7} \\ x_{1,0} & x_{1,1} & & x_{1,7} \\ \vdots & & \ddots & \vdots \\ x_{7,0} & x_{7,1} & \cdots & x_{7,7} \end{bmatrix} E_B^T\right) \otimes K_B \otimes K_B$$

The integer matrix $E_B$ and scaling matrix $K_B$ of the second embodiment transform are given below:

$$E_B = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 8 & -8 & -8 & 8 & 8 & -8 & -8 & 8 & 8 & -8 & -8 & 8 & 8 & -8 & -8 & 8 \\ 10 & -10 & -9 & 9 & 6 & -6 & -2 & 2 & -2 & 2 & 6 & -6 & -9 & 9 & 10 & -10 \\ 10 & -10 & -4 & 4 & -4 & 4 & 10 & -10 & -10 & 10 & 4 & -4 & 4 & -4 & -10 & 10 \\ 9 & -9 & 2 & -2 & -10 & 10 & 6 & -6 & 6 & -6 & -10 & 10 & 2 & -2 & 9 & -9 \\ 8 & -8 & 8 & -8 & -8 & 8 & -8 & 8 & 8 & -8 & 8 & -8 & -8 & 8 & -8 & 8 \\ 6 & -6 & 10 & -10 & 2 & -2 & -9 & 9 & -9 & 9 & 2 & -2 & 10 & -10 & 6 & -6 \\ 4 & -4 & 10 & -10 & 10 & -10 & 4 & -4 & -4 & 4 & -10 & 10 & -10 & 10 & -4 & 4 \\ 2 & -2 & 6 & -6 & 9 & -9 & 10 & -10 & 10 & -10 & 9 & -9 & 6 & -6 & 2 & -2 \end{bmatrix}$$

The scaling matrix of the second embodiment transform is:

$$K_B = \frac{1}{2}\begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}$$

where $a=\sqrt{512}$, $b=\sqrt{442}$ and $c=\sqrt{464}$.

The inverse 2D ICT of Y into X is $$X = E_B^T Y E_B = E_B^T \begin{bmatrix} y_{0,0} & y_{0,1} & \cdots & y_{0,15} \\ y_{1,0} & y_{1,1} & & y_{1,15} \\ \vdots & & \ddots & \vdots \\ y_{15,0} & y_{15,1} & \cdots & y_{15,15} \end{bmatrix} E_B$$

To implement the second embodiment of the order-16 transform $Z=(E_B X E_B^T)$, an intermediate data set Z' can be obtained in a first stage by the matrix operation $Z'=(E_B X)$. The intermediate data set Z is further processed by the operation $Z=(Z'E_B^T)$ to obtain the output data set Z.

Alternatively, fast algorithm can be applied to implement the second embodiment of the order-16 transform. Similar to the fast algorithm for the prior transform in the first embodiment, the fast algorithm of the second embodiment includes 2 order-8 fast ICTs and 8 additions and 8 subtractions as shown in FIG. 2. In the second embodiment, the integer transform has the same complexity as the first embodiment. Moreover, the implementation of scaling matrix for the second embodiment has a low storage requirement because the scaling matrix is periodic in a 4×4 pattern.

According to a first aspect of the present invention, there is provided a method for transforming an input data set represented by 16×16 matrix X, comprising the steps of: obtaining a transform matrix $E_A$ of order 16 $E_A=[A_0 \; A_1 \; \ldots \; A_{15}]$ by expanding a base matrix $E_8$ of order 8 $E_8$ [$B_0 \; B_1 \ldots B_7$] where $$A_{2k} = \begin{bmatrix} B_k \\ R_k \end{bmatrix}, A_{2k+1} = \begin{bmatrix} B_k \\ -R_k \end{bmatrix}, B_k = \begin{bmatrix} m_{0,k} \\ m_{1,k} \\ \vdots \\ m_{7,k} \end{bmatrix}, \text{ and}$$

$$R_k = \begin{bmatrix} & & & 1 \\ & & 1 & \\ & \iddots & & \\ 1 & & & \end{bmatrix} B_k = \begin{bmatrix} m_{7,k} \\ \vdots \\ m_{1,k} \\ m_{0,k} \end{bmatrix},$$

where k is an integer between 0 and 7; and transforming said input data set of a first domain with said transform matrix $E_{16}$ into a data set of a second domain. The step of transforming may be a forward transform of an input data set X into a data set Z, such that $Z=E_A X E_A^T$. Alternatively, the step of transforming may be an inverse transform of an input data set Y into a data set X, such that $X=E_A^T Y E_A$.

Preferably, the step of transforming is to transform an input data set X of a first domain with said transform matrix $E_{16}$ into a data set Z of a second domain additionally comprises the substeps of: receiving said input data set represented by 16×16 matrix X; initiating eight additions and eight subtractions on X for each j to output an intermediate 16×16 data set C:

$[c_{0,j}, c_{1,j}, \ldots, c_{15,j}] = [x_{0,j}+x_{1,j}, x_{2,j}+x_{3,j}, \ldots, x_{14,j}+x_{15,j}, x_{0,j}-x_{1,j}, x_{2,j}-x_{3,j}, \ldots, x_{14,j}-x_{15,j}]$; where j is an integer between 0 and 15; performing 8-point ICT to transform each column of a first portion of said intermediate data set $[c_{0,j}, c_{1,j}, \ldots, c_{7,j}]$ into a first portion of data set Z' $[z'_{0,j}, z'_{1,j}, \ldots, z'_{7,j}]$; applying said 8-point ICT to transform each column of a second portion of said intermediate data set $[c_{8,j}, c_{9,j}, \ldots, c_{15,j}]$ and output a second portion of data set Z' containing $[z'_{8,j}, z'_{9,j}, \ldots, z'_{15,j}]$; processing with eight additions and eight subtractions for each i on Z' to output an intermediate 16×16 data set C':

$[c'_{i,0}, c'_{i,1}, \ldots, c'_{i,15}] = [Z'_{i,0}+z'_{i,1}, z'_{i,2}+z'_{i,3}, z'_{i,14}+z'_{i,15}, z'_{i,0}-z'_{i,1}, z'_{i,2}-z'_{i,3}, \ldots, z'_{i,14}-z'_{i,15}]$; where i is an integer between 0 and 15; conducting a 8-point ICT to transform each row of a first portion of said intermediate data set $[c'_{i,0}, c'_{i,1}, \ldots, c'_{i,7}]$ into a first portion of data set Z $[z_{i,0}, z_{i,1}, \ldots, z_{i,7}]$; and carrying out said 8-point ICT to transform each row of a second portion of said intermediate data set $[c'_{i,8}, c'_{i,9}, \ldots, c'_{i,15}]$ and output a second portion of data set Z containing $[z_{i,8}, z_{i,9}, \ldots, z_{i,15}]$.

The transform matrix $$E_A = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 2 & -2 & -6 & 6 & 9 & -9 & -10 & 10 & 10 & -10 & -9 & 9 & 6 & -6 & -2 & 2 \\ 4 & -4 & -10 & 10 & 10 & -10 & -4 & 4 & -4 & 4 & 10 & -10 & -10 & 10 & 4 & -4 \\ 6 & -6 & -10 & 10 & 2 & -2 & 9 & -9 & -9 & 9 & -2 & 2 & 10 & -10 & -6 & 6 \\ 8 & -8 & -8 & 8 & -8 & 8 & 8 & -8 & 8 & -8 & -8 & 8 & -8 & 8 & 8 & -8 \\ 9 & -9 & -2 & 2 & -10 & 10 & -6 & 6 & 6 & -6 & 10 & -10 & 2 & -2 & -9 & 9 \\ 10 & -10 & 4 & -4 & -4 & 4 & -10 & 10 & -10 & 10 & -4 & 4 & 4 & -4 & 10 & -10 \\ 10 & -10 & 9 & -9 & 6 & -6 & 2 & -2 & -2 & 2 & -6 & 6 & -9 & 9 & -10 & 10 \\ 8 & -8 & 8 & -8 & 8 & -8 & 8 & -8 & 8 & -8 & 8 & -8 & 8 & -8 & 8 & -8 \end{bmatrix}$$

may be obtained by expanding $$E_8 = \begin{bmatrix} 8 & 8 & 8 & 8 & 8 & 8 & 8 & 8 \\ 10 & 9 & 6 & 2 & -2 & -6 & -9 & -10 \\ 10 & 4 & -4 & -10 & -10 & -4 & 4 & 10 \\ 9 & -2 & -10 & -6 & 6 & 10 & 2 & -9 \\ 8 & -8 & -8 & 8 & 8 & -8 & -8 & 8 \\ 6 & -10 & 2 & 9 & -9 & -2 & 10 & -6 \\ 4 & -10 & 10 & -4 & -4 & 10 & -10 & 4 \\ 2 & -6 & 9 & -10 & 10 & 9 & 6 & -2 \end{bmatrix}.$$

The method may further comprise the step of scaling said data set Z by performing element-by-element multiplication with a diagonal scaling matrix $K_A$ to obtain a 16×16 output data set Y of said second domain, where $$K_A = \frac{1}{2}\begin{bmatrix} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{bmatrix}$$

According to a second aspect of the present invention, there is provided a method for transforming an input data set represented by 16×16 matrix X, comprising the steps of: obtaining a transform matrix $E_B$ of order 16, $E_B=[A_0 A_1 \ldots A_{15}]$ by expanding a base matrix $E_8$ of order 8, $E_8=[B_0 B_1 \ldots B_7]$ where $$A_j = \begin{bmatrix} B_{Int(\frac{j}{2})} \\ (-1)^{Int(\frac{j+1}{2})} B_{Int(\frac{j}{2})} \end{bmatrix},$$

$$B_k = \begin{bmatrix} m_{0,k} \\ m_{1,k} \\ \vdots \\ m_{7,k} \end{bmatrix},$$

where j is an integer between 0 and 15; and k is an integer between 0 and 7; and $$\text{Int}\left(\frac{j+1}{2}\right) \text{ and } \text{Int}\left(\frac{j}{2}\right)$$

and represents the integral part of $$\frac{j+1}{2}$$

and $$\frac{j}{2}$$

respectively; and transforming said input data set of a first domain with said transform matrix $E_B$ into a data set of a second domain. The step of transforming may be a forward transform of an input data set X into a data set Z, such that $Z=E_B X E_B^T$. Alternatively, the step of transforming may be an inverse transform of an input data set Y into a data set X, such that $X=E_B^T Y E_B$.

Preferably, the step of transforming is to transform an input data set X of a first domain with said transform matrix $E_{16}$ into a data set Z of a second domain additionally comprises the substeps of: receiving said input data set represented by 16×16 matrix X; initiating eight additions and eight subtractions on X for each j to output an intermediate 16×16 data set C:

$[c_{0,j}, c_{1,j}, \ldots, c_{15,j}] = [x_{0,j}+x_{1,j}, x_{2,j}+x_{3,j}, \ldots, x_{14,j}+x_{15,j}, x_{0,j}-x_{1,j}, -x_{2,j}+x_{3,j}, \ldots, x_{15,j}-x_{14,j}]$;

performing 8-point ICT to transform each column of a first portion of said intermediate data set $[c_{0,j}, c_{1,j}, \ldots, c_{7,j}]$ into a first portion of data set Z' $[z'_{0,j}, z'_{1,j}, \ldots, z'_{7,j}]$; applying said 8-point ICT to transform each column of a second portion of said intermediate data set $[c_{8,j}, c_{9,j}, \ldots, c_{15,j}]$ and output a second portion of data set Z' containing $[z'_{8,j}, z'_{9,j}, \ldots, z'_{15,j}]$; processing with eight additions and eight subtractions for each i on Z' to output an intermediate 16×16 data set C':

$[c'_{i,0}, c'_{i,1}, \ldots, c'_{i,15}] = [z'_{i,0}+z'_{i,1}, z'_{i,2}+z'_{i,3}, \ldots, z'_{i,14}+z'_{i,15}, z'_{i,0}-z'_{i,1}, -z'_{i,2}+z'_{i,3}, \ldots, z'_{i,15}-z'_{i,14}]$; where i is an integer between 0 and 15;

conducting a 8-point ICT to transform each row of a first portion of said intermediate data set $[c'_{i,0}, c'_{i,1}, \ldots, c'_{i,7}]$ into a first portion of data set Z $[z'_{i,0}, z'_{i,1}, \ldots, z'_{i,7}]$; and carrying out said 8-point ICT to transform each row of a second portion of said intermediate data set $[c'_{i,8}, c'_{i,9}, \ldots, c'_{i,15}]$ and output a second portion of data set Z' containing $[z'_{i,8}, z'_{i,9}, \ldots, z'_{i,15}]$.

The transform matrix $$E_B = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 8 & -8 & -8 & 8 & 8 & -8 & -8 & 8 & 8 & -8 & -8 & 8 & 8 & -8 & -8 & 8 \\ 10 & -10 & -9 & 9 & 6 & -6 & -2 & 2 & -2 & 2 & 6 & -6 & -9 & 9 & 10 & -10 \\ 10 & -10 & -4 & 4 & -4 & 4 & 10 & -10 & -10 & 10 & 4 & -4 & 4 & -4 & -10 & 10 \\ 9 & -9 & 2 & -2 & -10 & 10 & 6 & -6 & 6 & -6 & -10 & 10 & 2 & -2 & 9 & -9 \\ 8 & -8 & 8 & -8 & -8 & 8 & -8 & -8 & 8 & -8 & 8 & -8 & 8 & -8 & 8 \\ 6 & -6 & 10 & -10 & 2 & -2 & -9 & 9 & -9 & 9 & 2 & -2 & 10 & -10 & 6 & -6 \\ 4 & -4 & 10 & -10 & 10 & -10 & 4 & -4 & 4 & -4 & 10 & -10 & 10 & -4 & 4 \\ 2 & -2 & 6 & -6 & 9 & -9 & 10 & -10 & 10 & -10 & 9 & -9 & 6 & -6 & 2 & -2 \end{bmatrix}$$

may be obtained by expanding $$E_8 = \begin{bmatrix} 8 & 8 & 8 & 8 & 8 & 8 & 8 & 8 \\ 10 & 9 & 6 & 2 & -2 & -6 & -9 & -10 \\ 10 & 4 & -4 & -10 & -10 & -4 & 4 & 10 \\ 9 & -2 & -10 & -6 & 6 & 10 & 2 & -9 \\ 8 & -8 & -8 & 8 & 8 & -8 & -8 & 8 \\ 6 & -10 & 2 & 9 & -9 & -2 & 10 & -6 \\ 4 & -10 & 10 & -4 & -4 & 10 & -10 & 4 \\ 2 & -6 & 9 & -10 & 10 & 9 & 6 & -2 \end{bmatrix}.$$

The method may further comprise the step of scaling said data set Z by performing element-by-element multiplication with a diagonal scaling matrix $K_B$ to obtain a 16×16 output data set Y of said second domain, where $$K_B = \frac{1}{2}\begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}$$

Advantageously, the base matrix being expanded in the embodiments of the claimed invention may be a reversible transform matrix such as an integer cosine transform matrix.

According to a third aspect of the present invention, there is provided a method for image encoding, comprising the steps of expanding a base matrix of order 8 into a transform matrix of order 16; determining transform size between 8 and 16; and transforming an input image data set of spatial domain into intermediate data set of frequency domain using either said base matrix or said transform matrix based on the decision in said step of determining transform size.

The method may further include the steps of scaling said intermediate data set into a scaled data set; quantizing said scaled data set into a quantized data set; and performing entropy coding on said quantized data set.

Advantageously, the step of scaling is performed by normal scaling, prescaling, or postscaling.

In addition, the step of determining transform size may be achieved by comparing a rate distortion cost.

In another embodiment of the invention, the step of determining transform size is to use transform size of 8×8 for high variance of pixel correlation, and larger transform sizes such as 16×8, 8×16, or 16×16 for low variance of pixel correlation. In a further embodiment of the invention, the step of determining transform size is to use transform size of M×N, such as 8×8 if there are more than M×N coefficients, and to use larger transform sizes such as 16×8, 8×16, or 16×16 if there are M×N coefficients or less.

Preferably, the method for image encoding further includes the step of amplifying before said step of quantizing, wherein the elements in said intermediate data set corresponding to high frequency components are amplified.

Furthermore, the step of quantizing may further include the substep of reducing the quantization factor for those elements corresponding to high frequency components.

Other aspects of the invention are also disclosed.

DESCRIPTION OF PREFERRED EMBODIMENTS

The present invention provides systems, apparatuses, methods, and computer program products to process an order-16 integer transform during image and video coding in a more efficient fashion. More particularly, the present invention shifts the decoding of an order-8 integer transform matrix to an order-16 integer transform matrix while implementing an integer transform. The order-16 integer transform matrix is then processed instead of the order-8 integer transform matrix. After the integer transform is complete, a result of the integer transform is re-sized.

Figure 1:
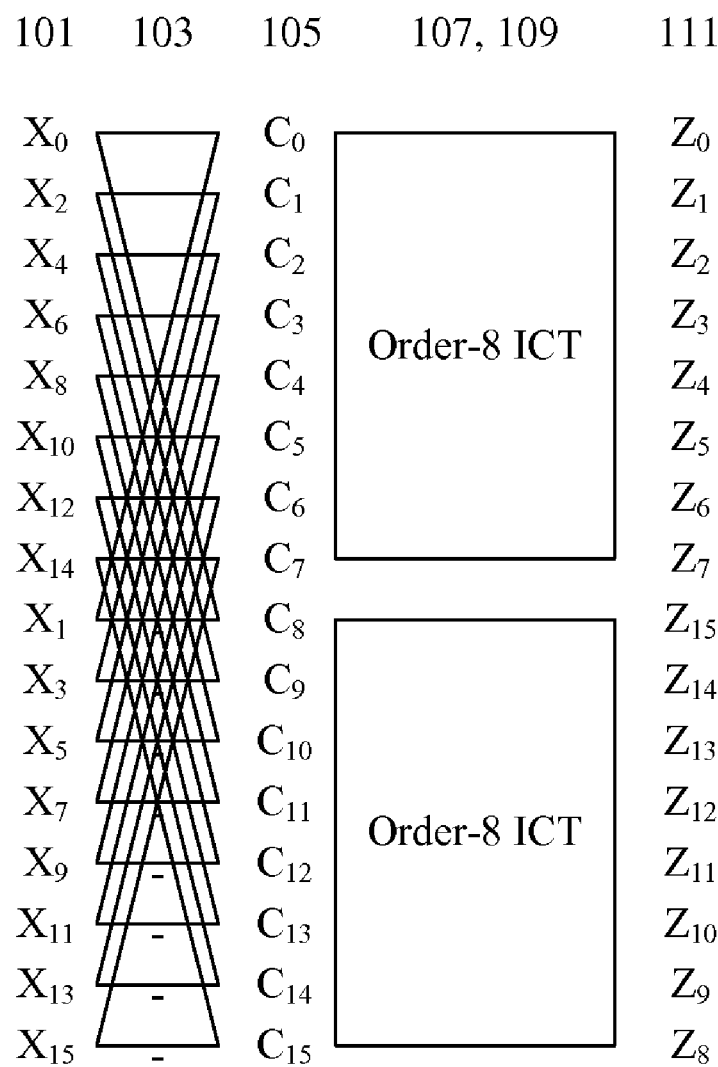
FIG. 1 illustrates a first embodiment of this invention, in which a fast algorithm for the order-16 transform $E_A$ is illustrated.

FIG. 1 illustrates a first embodiment of this invention, in which a Fast algorithm for the order-16 transform is illustrated. The fast algorithm for the computation of Z from X consists of a fast algorithm for the computation of the order-8 transform $E_8$ twice, and eight additions and eight subtractions.

In FIG. 1, input data 101 $X_0$ to $X_{15}$ are converted into intermediate results 105 $C_0$ to $C_{15}$ by eight additions and eight subtractions 103, which are then converted into $Z_0 \sim Z_{15}$ 111 by two order-8 transform $E_8$ 107, 109. In the following 2D transform example, the disclosed 1D transform is used 16 times in the horizontal direction and 16 times in the vertical direction to convert a 16×16 matrix of pixels or residues into a 16×16 matrix of transform coefficients. In a video coding standard, the corresponding data to be transformed are 2D data. As a result, the 2D fast algorithm can be achieved by cascading the 1D transform as given in FIG. 1 in horizontal and vertical to convert 16×16 matrix X of elements $x_{i,j}$ into matrix Z of elements $z_{i,j}$ as given in $Z=E_A X E_A^T$.

Figure 2:
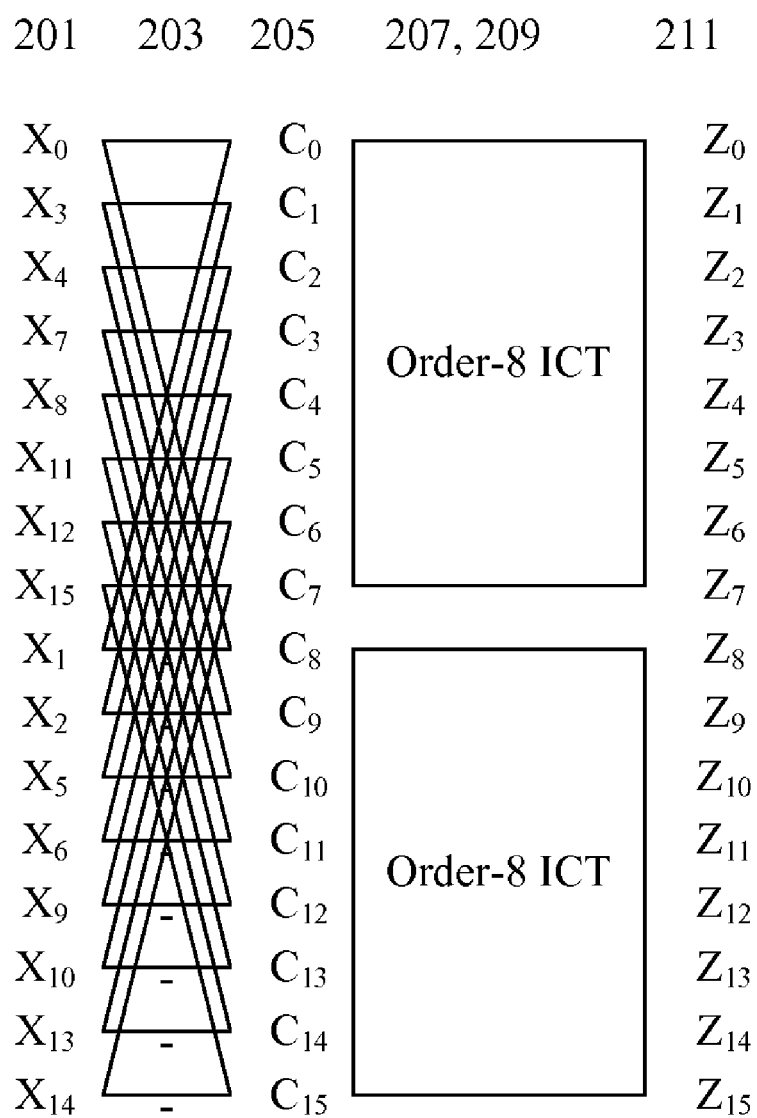
FIG. 2 illustrates a second embodiment of this invention, in which another fast algorithm for the order-16 transform $E_B$ is illustrated.

FIG. 2 illustrates a second embodiment of this invention, in which a Fast algorithm for the order-16 transform is illustrated. The fast algorithm for the computation of Z from X consists of a fast algorithm for the computation of the order-8 transform $E_8$ twice, and eight additions and eight subtractions, and scaling matrix implemented with a periodic 4×4 pattern different from the first embodiment. Accordingly, the second embodiment of the order-16 integer transform has the same complexity as the first embodiment. Moreover, the implementation of scaling matrix for the second embodiment can have a lower storage requirement because the scaling matrix is periodic in a 4×4 pattern.

In FIG. 2, input data 201 $X_0$ to $X_{15}$ are converted into intermediate results 205 $C_0$ to $C_{15}$ by eight additions and eight subtractions 203, which are then converted into $Z_0 \sim Z_{15}$ 211 by two order-8 transform $E_8$ 207, 209. In the following 2D transform example, the disclosed 1D transform is used 16 times in the horizontal direction and 16 times in the vertical direction to convert a 16×16 matrix of pixels or residues into a 16×16 matrix of transform coefficients. In a video coding standard, the corresponding data to be transformed are 2D data. As a result, the 2D fast algorithm can be achieved by cascading the 1D transform as given in FIG. 2 in horizontal and vertical to convert 16×16 matrix X of elements $x_{i,j}$ into matrix Z of elements $z_{i,j}$ as given in $Z=E_B X E_B^T$.

Figure 3:
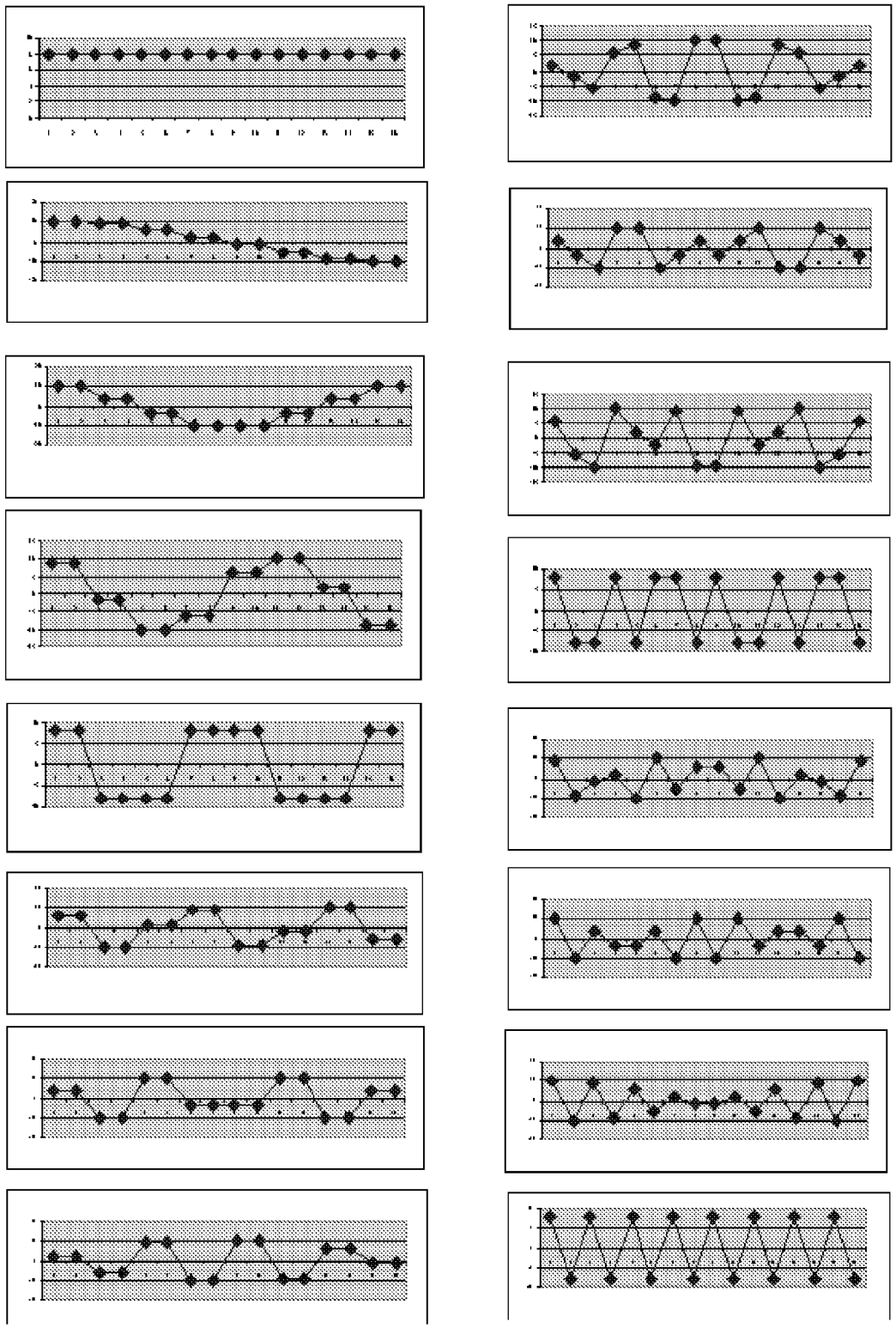
FIG. 3 illustrates the waveform of the first transform embodiment.

FIG. 3 illustrates the waveform of the first transform embodiment.

Figure 4:
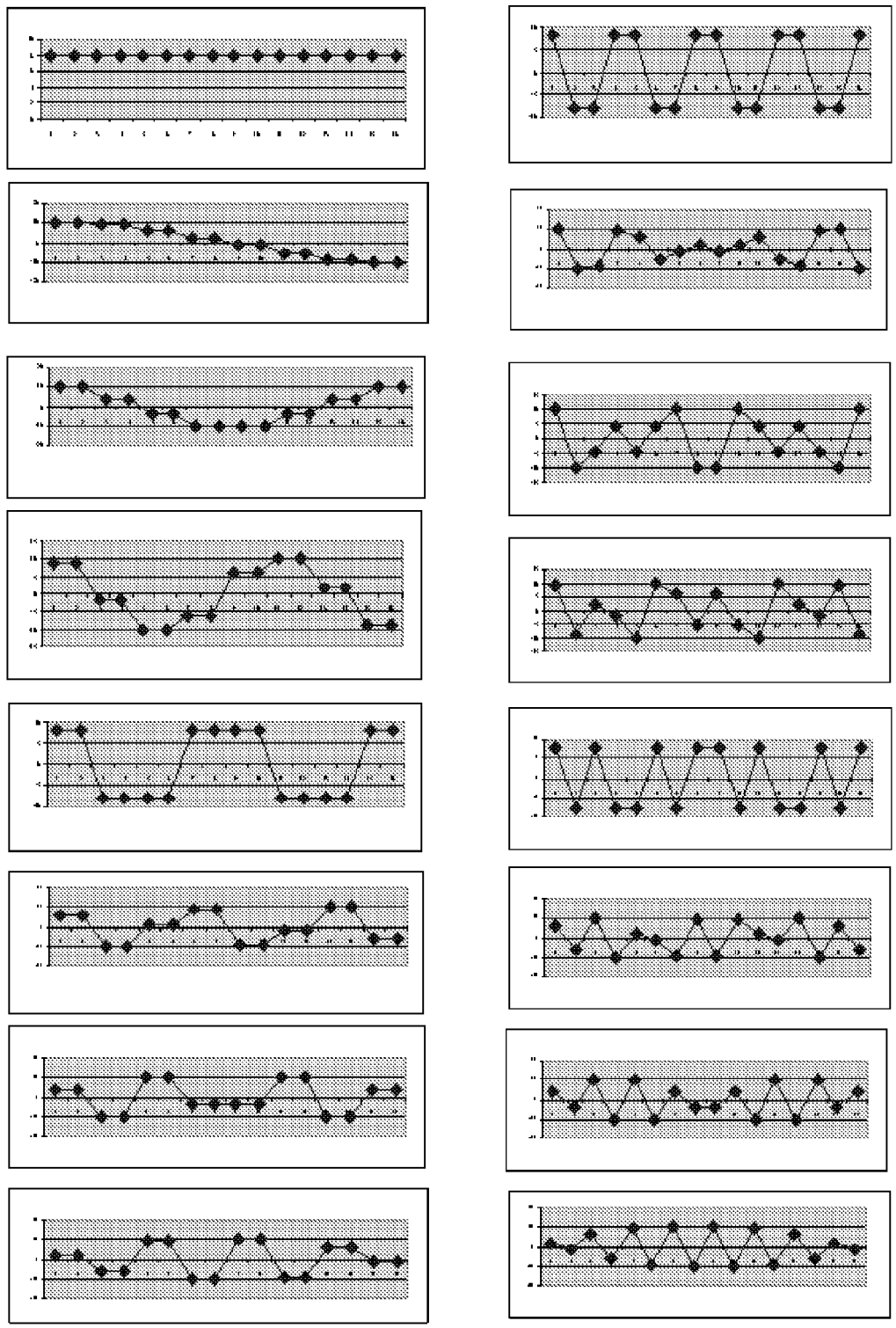
FIG. 4 illustrates the waveform of the second transform embodiment.

FIG. 4 illustrates the waveform of the second transform embodiment.

Figure 5:
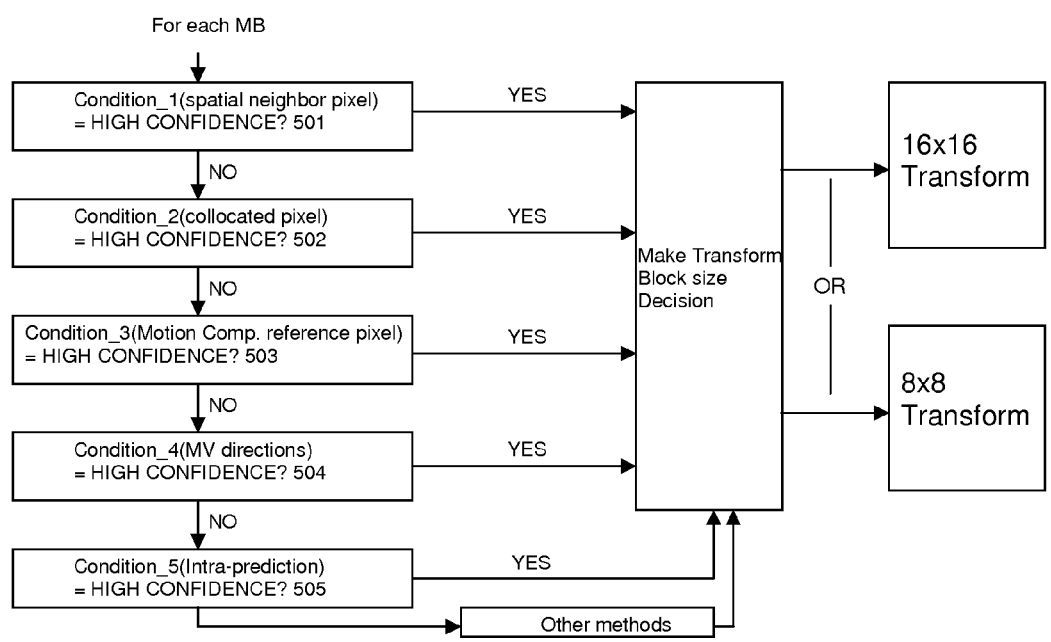
FIG. 5 illustrates the flow diagram by which the transform size decision is determined.

FIG. 5 illustrates the flow diagram by which the transform size decision is determined. Normally, two different ways are used to indicate the transform size for each MB of image data. One way is to indicate the transform size explicitly by bits. As a result, the transform size is directly coupled with motion compensation size. When using the claimed method and related device, the pixel correlation of the neighbor MB is used, which includes the spatial and temporal domains, and motion vector information to decide the transform size for each MB. As depicted in FIG. 5, one example for Transform size indication method is illustrated based on reconstructed pixel and MVs. According to the process illustrated in FIG. 5, the conditions detailed include sum of pixel difference, pixel variance and any pixel classification methods. Each of the conditions can identify itself as high or low confidence based on the regarding video content. There is no restriction on the order of the decision flow and which items should be chose from the above list and the algorithm can combine them freely, and can be incorporated with other related decision methods. Transform size decision conditions depicted in FIG. 5 include Condition_1: Upper and/or left recon pixels 501; Condition_2: Temporal collocated MB 502; Condition_3: Motion compensation reference block 503; Condition_4: Motion vector information of current MB for inter MB 504 and Condition_5: Intra prediction mode for intra MB 505.

Alternatively, the following logic can be applied as detailed below. In this case, the Sum of Pixel Difference (SPD) is the sum of the absolute difference of all neighbor pixels along one direction (e.g. diagonal) inside one MB and all the thresholds can be defined adaptively.

The following steps summarize the process for determining the transform size based on the Sum of Pixel Difference (SPD):

Compute the Sum of Pixel difference (SPD) for all the reconstructed pixel in the upper and left MB to obtain SPD(sum)=SPD(left)+SPD(upper).

If SPD(sum)>Threshold_1, DO 8×8 and STOP.
If SPD(sum)<Threshold_2, DO 16×16 and STOP.
Compute the SPD for all the reconstructed pixel in the collocated MB in the previous frame (same coordinate with current MB), we got SPD(coll)
If SPD(coll)>Threshold_3, DO 8×8 and STOP.
If SPD(coll)<Threshold_4, DO 16×16 and STOP.
Compute the SPD for all the reconstructed pixel in the referenced MB in the previous frame (location that current MV points to), we got SPD(ref)
If SPD(ref)>Threshold_5, DO 8×8 and STOP.
If SPD(ref)<Threshold_6, DO 16×16 and STOP.
Obtain 4 MV for current MB (one MV for each 8×8 block inside the current MB), compute the MV variance using these 4 MVs.
If MV_variance>Threshold_7, DO 8×8 and STOP.
If MV_variance<Threshold_8, DO 16×16 and STOP.
Obtain the intra-prediction mode of current MB (if exists).
If Intra-mode!=DC mode, DO 8×8 and STOP.
DO 16×16 and STOP.

Figure 6:
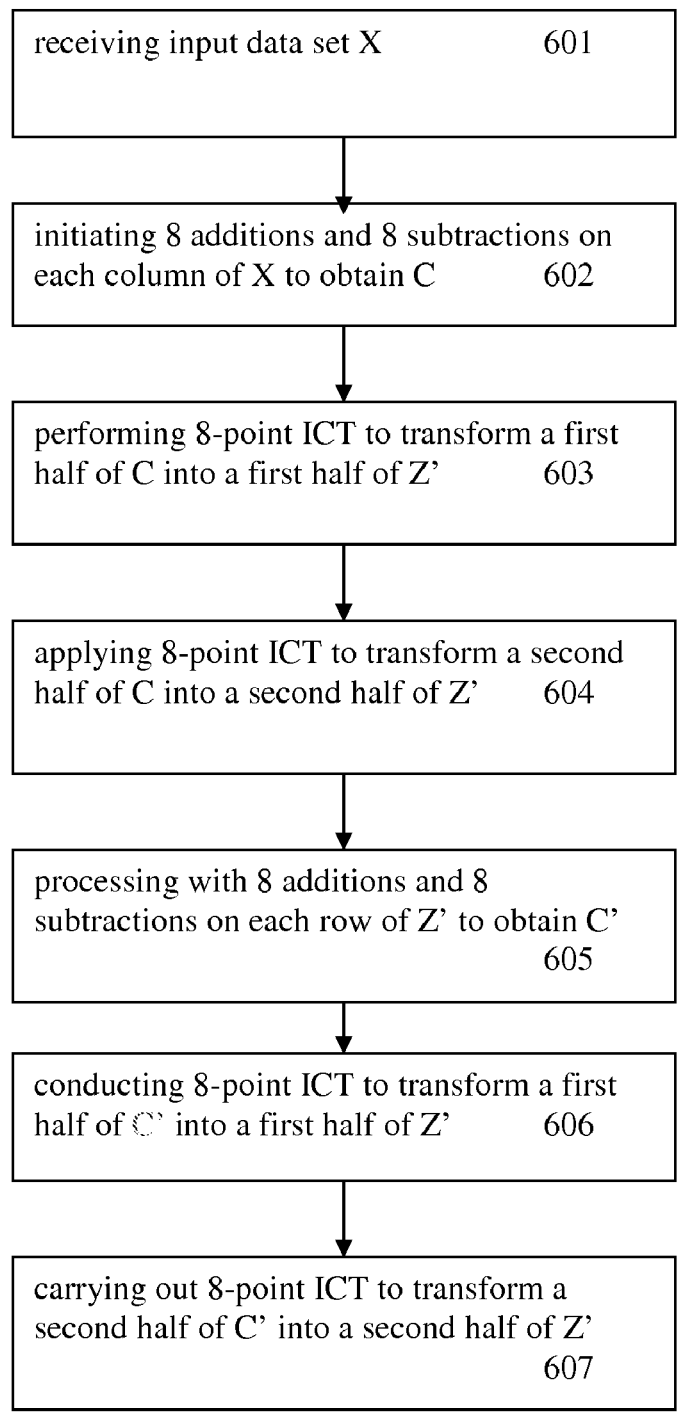
FIG. 6 illustrates the flow diagram for performing a 2 dimensional order-16 transform with the fast algorithm according to an embodiment of the claimed invention.

FIG. 6 is a flow diagram for performing a two dimensional order-16 transform with the fast algorithm according to an embodiment of the claimed invention. Processing commences in step 601, where input data set X represented by 16×16 matrix is received. The data set may represent a macroblock of an image. In step 602, eight additions and eight subtractions are initiated on each column of input data set X to output an intermediate 16×16 data set C. In step 603, a 8-point ICT using transform matrix $E_8$ is performed on each column of the first half of the intermediate data set C into the first half of a 16×16 data set Z'. In step 604, a 8-point ICT using transform matrix $E_8$ is applied to transform each column of the second half of the intermediate data set C and output the second half of data set Z'. In step 605, eight additions and eight subtractions are processed on each row of input data set Z' to output an intermediate 16×16 data set C'. In step 606, a 8-point ICT using transform matrix $E_8$ is conducted on each row of the first half of the intermediate data set C' into the first half of a 16×16 data set Z. In step 607, a 8-point ICT using transform matrix $E_8$ is applied to transform each row of the second half of the intermediate data set C' and output the second half of data set Z'.

In one embodiment of the invention, the additions and subtraction in step 602 can be performed such that $[c_{0,j}, c_{1,j}, \ldots, c_{15,j}] = [x_{0,j}+x_{1,j}, x_{2,j}+x_{3,j}, \ldots, x_{14,j}+x_{15,j}, x_{0,j}-x_{1,j}, x_{2,j}-x_{3,j}, \ldots, x_{14,j}-x_{15,j}]$; where j is an integer between 0 and 15;

and in step 605 such that $[c'_{i,0}, c'_{i,1}, \ldots, c'_{i,15}] = [z'_{i,0}+z'_{i,1}, z'_{i,2}+z'_{i,3}, \ldots, z'_{i,14}+z'_{i,15}, z'_{i,0}-z'_{i,1}, z'_{i,2}-z'_{i,3}, \ldots, z'_{i,14}-z'_{i,15}]$;
where i is an integer between 0 and 15.

In another embodiment of the invention, the additions and subtraction in step 602 can be performed such that $[c_{0,j}, c_{1,j}, \ldots, c_{15,j}] = [x_{0,j}+x_{1,j}, x_{2,j}+x_{3,j}, \ldots, x_{14,j}+x_{15,j}, x_{0,j}-x_{1,j}, -x_{2,j}+x_{3,j}, \ldots, x_{15,j}-x_{14,j}]$;
where j is an integer between 0 and 15;
and in step 605 such that $[c'_{i,0}, c'_{i,1}, \ldots, c'_{i,15}] = [z'_{i,0}+z'_{i,1}, z'_{i,2}+z'_{i,3}, \ldots, c'_{i,14}+z'_{i,15}, Z'_{i,0}-z'_{i,1}, -z'_{i,2}+z'_{i,3}, \ldots, z'_{i,15}-z'_{i,14}]$;
where i is an integer between 0 and 15.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

We claim:

1. A processor implemented method for transforming an input data set of a first domain for image and video coding, comprising the steps of:

receiving, by a processor, said input data set represented by 16×16 matrix X; and transforming, by the processor, said input data set with a transform matrix $E_{16}$ into a data set of a second domain, comprising:

initiating eight additions and eight subtractions on X for each j to output an intermediate 16×16 data set C: $[c_{0,j}, c_{1,j}, \ldots c_{15,j}] = [x_{0,j}+x_{1,j}, x_{2,j}+x_{3,j}, x_{4,j}+x_{5,j}, x_{6,j}+x_{7,j}, x_{8,j}+x_{9,j}, x_{10,j}+x_{11,j}, x_{12,j}+x_{13,j}, x_{14,j}+x_{15,j}, x_{0,j}-x_{1,j}, x_{2,j}-x_{3,j}, x_{4,j}-x_{5,j}, x_{6,j}-x_{7,j}, x_{8,j}-x_{9,j}, x_{10,j}-x_{11,j}, x_{12,j}-x_{13,j}, x_{14,j}-x_{15,j}]$; where j is an integer between 0 and 15;

performing 8-point ICT to transform each column of a first portion of said intermediate data set $[c_{0,j}, c_{1,j}, \ldots, c_{7,j}]$ into a first portion of data set Z' $[z'_{0,j}, z'_{1,j}, \ldots, z'_{7,j}]$;

applying said 8-point ICT to transform each column of a second portion of said intermediate data set $[c_{8,j}, c_{9,j}, \ldots, c_{15,j}]$ and output a second portion of data set Z' containing $[z'_{8,j}, z'_{9,j}, \ldots, z'_{15,j}]$;

processing with eight additions and eight subtractions on Z' for each i to output an intermediate 16×16 data set C': $[c'_{i,0}, c'_{i,1}, \ldots, c'_{i,15}] = [z'_{i,0}+z'_{i,1}, z'_{i,2}+z'_{i,3}, \ldots, z'_{i,14}+z'_{i,15}, z'_{i,0}-z'_{i,1}, z'_{i,2}-z'_{i,3}, \ldots, z'_{i,14}-z'_{i,15}]$; where i is an integer between 0 and 15;

conducting a 8-point ICT to transform each row of a first portion of said intermediate data set $[c'_{i,0}, c'_{i,1}, \ldots, c'_{i,7}]$ into a first portion of data set Z $[z_{i,0}, z_{i,1}, \ldots, z_{i,7}]$; and carrying out said 8-point ICT to transform each row of a second portion of said intermediate data set $[c'_{i,8}, c_{i,9}, \ldots, c'_{i,15}]$ and output a second portion of data set Z containing $[z_{i,8}, z_{i,9}, \ldots, z_{i,15}]$;

wherein said transform matrix $E_{16}$ being of order 16

$E_{16} = [A_0\ A_1\ \ldots\ A_{15}]$ is obtained by expanding a base matrix $E_8$ of order 8

$E_8 = [B_0\ B_1\ \ldots\ B_7]$ where $$A_{2k} = \begin{bmatrix} B_k \\ R_k \end{bmatrix}, A_{2k+1} = \begin{bmatrix} B_k \\ -R_k \end{bmatrix}, B_k = \begin{bmatrix} m_{0,k} \\ m_{1,k} \\ \vdots \\ m_{7,k} \end{bmatrix}, \text{and}$$

$$R_k = \begin{bmatrix} & & & 1 \\ & & 1 & \\ & \iddots & & \\ 1 & & & \end{bmatrix} B_k = \begin{bmatrix} m_{7,k} \\ \vdots \\ m_{1,k} \\ m_{0,k} \end{bmatrix},$$

where k is an integer between 0 and 7.

2. The method for transforming according to claim 1, wherein said transform matrix $E_{16}$ being $$E_{16} = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 2 & -2 & -6 & 6 & 9 & -9 & -10 & 10 & 10 & -10 & -9 & 9 & 6 & -6 & -2 & 2 \\ 4 & -4 & -10 & 10 & 10 & -10 & -4 & 4 & -4 & 4 & 10 & -10 & -10 & 10 & 4 & -4 \\ 6 & -6 & -10 & 10 & 2 & -2 & 9 & -9 & -9 & 9 & -2 & 2 & 10 & -10 & -6 & 6 \\ 8 & -8 & -8 & 8 & -8 & 8 & 8 & -8 & 8 & -8 & -8 & 8 & -8 & 8 & 8 & -8 \\ 9 & -9 & -2 & 2 & -10 & 10 & -6 & 6 & 6 & -6 & 10 & -10 & 2 & -2 & -9 & 9 \\ 10 & -10 & 4 & -4 & -4 & 4 & -10 & 10 & -10 & 10 & -4 & 4 & 4 & -4 & 10 & -10 \\ 10 & -10 & 9 & -9 & 6 & -6 & 2 & -2 & -2 & 2 & -6 & 6 & -9 & 9 & -10 & 10 \\ 8 & -8 & 8 & -8 & 8 & -8 & 8 & -8 & 8 & -8 & 8 & -8 & 8 & -8 & 8 & -8 \end{bmatrix}$$

is obtained by expanding $$E_8 = \begin{bmatrix} 8 & 8 & 8 & 8 & 8 & 8 & 8 & 8 \\ 10 & 9 & 6 & 2 & -2 & -6 & -9 & -10 \\ 10 & 4 & -4 & -10 & -10 & -4 & 4 & 10 \\ 9 & -2 & -10 & -6 & 6 & 10 & 2 & -9 \\ 8 & -8 & -8 & 8 & 8 & -8 & -8 & 8 \\ 6 & -10 & 2 & 9 & -9 & -2 & 10 & -6 \\ 4 & -10 & 10 & -4 & -4 & 10 & -10 & 4 \\ 2 & -6 & 9 & -10 & 10 & 9 & 6 & -2 \end{bmatrix}.$$

3. The method for transforming according to claim 1, wherein said step of expanding a base matrix is expanding a reversible transform matrix.

4. The method for transforming according to claim 3, wherein said step of expanding a reversible transform matrix is expanding an integer cosine transform matrix.

5. The method for transforming according to claim 1, further comprising the step of scaling, by the processor said data set Z by performing element-by-element multiplication with a diagonal scaling matrix $K_{16}$ to obtain a 16×16 output data set Y of said second domain, where $$K_{16} = \frac{1}{2}\begin{bmatrix} a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \\ ab & b^2 & bc & b^2 & ab & b^2 & bc & b^2 & b^2 & bc & b^2 & ab & b^2 & bc & b^2 & ab \\ ac & bc & c^2 & bc & ac & bc & c^2 & bc & bc & c^2 & bc & ac & bc & c^2 & bc & ac \\ ab & b^2 & bc & b^2 & ab & b^2 & bc & b^2 & b^2 & bc & b^2 & ab & b^2 & bc & b^2 & ab \\ a^2 & ab & ac & ab & a^2 & ab & ac & ab & ab & ac & ab & a^2 & ab & ac & ab & a^2 \end{bmatrix}.$$

6. A processor implemented method for transforming an input data set of a first domain for image and video coding, comprising the steps of:
 receiving, by a processor, said input data set represented by a 16×16 matrix X; and
 transforming, by the processor, said input data set with a transform matrix $E_{16}$ into a data set of a second domain, comprising:
 initiating eight additions and eight subtractions on X for each j to output an intermediate 16×16 data set C: $[c_{0,j}, c_{1,j}, \ldots, c_{15,j}] = [x_{0,j}+x_{1,j}, x_{2,j}+x_{3,j}, \ldots, x_{14,j}+x_{15,j}, x_{0,j}-x_{1,j}, -x_{2,j}+x_{3,j}, \ldots x_{15,j}-x_{14,j}]$;

performing 8-point ICT to transform each column of a first portion of said intermediate data set $[c_{0,j}, c_{1,j}, c_{7,j}]$ into a first portion of data set Z' $[z'_{0,j}, z'_{1,j}, \ldots, z'_{7,j}]$;

applying said 8-point ICT to transform each column of a second portion of said intermediate data set $[c_{8,j}, c_{9,j}, c_{15,j}]$ and output a second portion of data set Z' containing $[z'_{8,j}, z'_{9,j}, \ldots z'_{15,j}]$;

processing with eight additions and eight subtractions on Z' for each i to output an intermediate 16×16 data set C': $[c'_{i,0}, C'_{i,1}, \ldots, c'_{i,15}] = [z'_{i,0}+z'_{i,1}, z'_{i,2}+z'_{i,3}, \ldots, z'_{i,14}+z'_{i,15}, z'_{i,0}-z'_{i,1}, -z'_{i,2}+z'_{i,3}, \ldots, z'_{i,15}-z'_{i,14}]$; where i is an integer between 0 and 15;

conducting a 8-point ICT to transform each row of a first portion of said intermediate data set $[c'_{i,0}, c'_{i,1}, \ldots, c'_{i,7}]$ into a first portion of data set Z $[z_{i,0}, z_{i,1}, \ldots z_{i,7}]$; and carrying out said 8-point ICT to transform each row of a second portion of said intermediate data set $[c'_{i,8}, c'_{i,9}, c'_{i,15}]$ and output a second portion of data set Z containing $[z_{i,8}, z_{i,9}, \ldots z_{i,15}]$;

wherein said transform matrix $E_{16}$ being of order 16 $E_{16} = [A_0 \, A_1 \, \ldots \, A_{15}]$ is obtained by expanding a base matrix $E_8$ of order 8 $E_8 = [B_0 \, B_1 \, \ldots \, B_7]$ where $$A_j = \begin{bmatrix} B_{Int(\frac{j}{2})} \\ (-1)^{Int(\frac{j+1}{2})} B_{Int(\frac{j}{2})} \end{bmatrix}, B_k = \begin{bmatrix} m_{0,k} \\ m_{1,k} \\ \vdots \\ m_{7,k} \end{bmatrix},$$

where j is an integer between 0 and 15; and k is an integer between 0 and 7; and $$Int\left(\frac{j+1}{2}\right) \text{ and } Int\left(\frac{j}{2}\right)$$

represents the integral part of $$\frac{j+1}{2}$$

and $$\frac{j}{2}$$

respectively.

7. The method for transforming according to claim 6, wherein said transform matrix $E_{16}$ being $$E_{16} = \begin{bmatrix} 8 & 8 & 8 & 8 & 8 & 8 & 8 & 8 & 8 & 8 & 8 & 8 & 8 & 8 & 8 & 8 \\ 10 & 10 & 9 & 9 & 6 & 6 & 2 & 2 & -2 & -2 & -6 & -6 & -9 & -9 & -10 & -10 \\ 10 & 10 & 4 & 4 & -4 & -4 & -10 & -10 & -10 & -10 & -4 & -4 & 4 & 4 & 10 & 10 \\ 9 & 9 & -2 & -2 & -10 & -10 & -6 & -6 & 6 & 6 & 10 & 10 & 2 & 2 & -9 & -9 \\ 8 & 8 & -8 & -8 & -8 & -8 & 8 & 8 & 8 & 8 & -8 & -8 & -8 & -8 & 8 & 8 \\ 6 & 6 & -10 & -10 & 2 & 2 & 9 & 9 & -9 & -9 & -2 & -2 & 10 & 10 & -6 & -6 \\ 4 & 4 & -10 & -10 & 10 & 10 & -4 & -4 & -4 & -4 & 10 & 10 & -10 & -10 & 4 & 4 \\ 2 & 2 & -6 & -6 & 9 & 9 & -10 & -10 & 10 & 10 & -9 & -9 & 6 & 6 & -2 & -2 \\ 8 & -8 & -8 & 8 & 8 & -8 & -8 & 8 & 8 & -8 & -8 & 8 & 8 & -8 & -8 & 8 \\ 10 & -10 & -9 & 9 & 6 & -6 & -2 & 2 & -2 & 2 & 6 & -6 & -9 & 9 & -10 & 10 \\ 10 & -10 & -4 & 4 & -4 & 4 & 10 & -10 & -10 & 10 & 4 & -4 & 4 & -4 & -10 & 10 \\ 9 & -9 & 2 & -2 & -10 & 10 & 6 & -6 & 6 & -6 & -10 & 10 & 2 & -2 & 9 & -9 \\ 8 & -8 & 8 & -8 & -8 & 8 & -8 & 8 & 8 & -8 & 8 & -8 & -8 & 8 & -8 & 8 \\ 6 & -6 & 10 & -10 & 2 & -2 & -9 & 9 & -9 & 9 & 2 & -2 & 10 & -10 & 6 & -6 \\ 4 & -4 & 10 & -10 & 10 & -10 & 4 & -4 & -4 & 4 & -10 & 10 & -10 & 10 & -4 & 4 \\ 2 & -2 & 6 & -6 & 9 & -9 & 10 & -10 & 10 & -10 & 9 & -9 & 6 & -6 & 2 & -2 \end{bmatrix}$$

is obtained by expanding $$E_8 = \begin{bmatrix} 8 & 8 & 8 & 8 & 8 & 8 & 8 & 8 \\ 10 & 9 & 6 & 2 & -2 & -6 & -9 & -10 \\ 10 & 4 & 4 & -10 & -10 & -4 & 4 & 10 \\ 9 & -2 & -10 & -6 & 6 & 10 & 2 & -9 \\ 8 & -8 & -8 & 8 & 8 & -8 & -8 & 8 \\ 6 & -10 & 2 & 9 & -9 & -2 & 10 & -6 \\ 4 & -10 & 10 & -4 & -4 & 10 & -10 & 4 \\ 2 & -6 & 9 & -10 & 10 & 9 & 6 & -2 \end{bmatrix}.$$

8. The method for transforming according to claim 6, wherein said step of expanding a base matrix is expanding a reversible transform matrix.

9. The method for transforming according to claim 8, wherein said step of expanding a reversible transform matrix is expanding an integer cosine transform matrix.

10. The method for transforming according to claim 6, further comprising the step of scaling, by the processor, said data set Z by performing element-by-element multiplication with a diagonal scaling matrix $K_{16}$ to obtain a 16×16 output data set Y of said second domain, where $$K_{16} = \frac{1}{2}\begin{bmatrix} a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \\ a^2 & ab & ac & ab & a^2 & ab & ac & ab & a^2 & ab & ac & ab & a^2 & ab & ac & ab \\ ab & b^2 & bc & b^2 & ab & b^2 & bc & b^2 & ab & b^2 & bc & b^2 & ab & b^2 & bc & b^2 \\ ac & bc & c^2 & bc & ac & bc & c^2 & bc & ac & bc & c^2 & bc & ac & bc & c^2 & bc \\ ab & b^2 & bc & b^2 & ab & b^2 & bc & b^2 & ab & b^2 & bc & b^2 & ab & b^2 & bc & b^2 \end{bmatrix}.$$

11. The method for transforming according to claim 1, wherein said step of transforming is a forward transform of an input data set X into a data set Z, such that $Z=E_{16}XE_{16}^T$.

12. The method for transforming according to claim 1, wherein said step of transforming is a inverse transform of an input data set Y into a data set X, such that $X=E_{16}^TYE_{16}$.

13. The method for transforming according to claim 6, wherein said step of transforming is a forward transform of an input data set X into a data set Z, such that $Z=E_{16}XE_{16}^T$.

14. The method for transforming according to claim 6, wherein said step of transforming is an inverse transform of an input data set Y into a data set X, such that $X=E_{16}^TYE_{16}$.

* * * * *